United States Patent
Delgrosso

(10) Patent No.: US 9,723,879 B1
(45) Date of Patent: Aug. 8, 2017

(54) FINGER SHEATHS

(71) Applicant: SUMVIA, LLC, Thousand Oaks, CA (US)

(72) Inventor: Peter Delgrosso, Thousand Oaks, CA (US)

(73) Assignee: SUMVIA, LLC, Thousand Oaks, CA (US)

( * ) Notice: Subject to any disclaimer, the term of this patent is extended or adjusted under 35 U.S.C. 154(b) by 0 days.

(21) Appl. No.: 15/157,571

(22) Filed: May 18, 2016

Related U.S. Application Data

(60) Provisional application No. 62/174,754, filed on Jun. 12, 2015.

(51) Int. Cl.
*A41D 13/08* (2006.01)
*A41D 31/00* (2006.01)

(52) U.S. Cl.
CPC ....... *A41D 13/087* (2013.01); *A41D 31/0077* (2013.01); *A41D 2400/80* (2013.01)

(58) Field of Classification Search
CPC .... A41D 13/087; A41D 19/00; A41D 13/082; A61B 19/04
USPC .............. 2/21, 163, 166, 167, 168; 223/101; 128/881
See application file for complete search history.

(56) References Cited

U.S. PATENT DOCUMENTS

| | | | | |
|---|---|---|---|---|
| 1,380,960 | A * | 6/1921 | Hmenia | A41D 13/087 2/21 |
| 1,633,037 | A * | 6/1927 | Rood | A61F 5/50 128/880 |
| 2,039,505 | A * | 5/1936 | Vollmer | A61F 13/105 2/21 |
| 2,633,126 | A * | 3/1953 | Newmark | A61F 5/50 128/880 |
| 5,577,272 | A * | 11/1996 | Fisher | A41D 13/087 2/163 |
| 6,257,785 | B1 * | 7/2001 | Otten | A45D 40/26 401/261 |
| 6,640,341 | B1 * | 11/2003 | Calvert | A41D 13/087 2/161.3 |
| 7,249,385 | B2 * | 7/2007 | Schukraft | A61F 13/105 128/880 |
| 7,779,483 | B2 * | 8/2010 | Berry | A41D 13/087 132/73 |

(Continued)

*Primary Examiner* — Tejash Patel
(74) *Attorney, Agent, or Firm* — Los Angeles Patent Group; Arman Katiraei

(57) ABSTRACT

Finger sheaths provide individual finger coverings. The individual finger coverings prevent the transfer of germs, dirt, and other residual and harmful elements onto the user's fingers when contacting exposed surfaces or items as well as their transfer from the user's fingers to the user's mouth while eating finger foods. The individual finger coverings further prevent the transfer of residual elements from the finger food onto the user's fingers. The finger sheaths have a non-permeable organic composition that does no impart undesired tastes. The finger sheaths can be incorporated with antimicrobial, antiviral, antibacterial, and antifungal properties about the outside surface and a sanitizing gel on the inside surface. The finger sheaths can be incorporated with custom flavorings and imprinted with digestible dyes to present custom patterns.

19 Claims, 5 Drawing Sheets

(56) References Cited

U.S. PATENT DOCUMENTS

| | | | | |
|---|---|---|---|---|
| 2005/0268369 A1* | 12/2005 | Santiago | ............... | B42D 9/04 |
| | | | | 2/21 |
| 2012/0222186 A1* | 9/2012 | Vena | ............... | A41D 13/087 |
| | | | | 2/21 |
| 2014/0078118 A1* | 3/2014 | Robb | ............... | G06F 3/039 |
| | | | | 345/179 |
| 2014/0215676 A1* | 8/2014 | Jones | ............... | A41D 13/087 |
| | | | | 2/21 |
| 2014/0283279 A1* | 9/2014 | Pratho | ............... | A41D 13/087 |
| | | | | 2/163 |
| 2014/0331377 A1* | 11/2014 | Taylor-Lopez | ...... | A41D 13/087 |
| | | | | 2/21 |

* cited by examiner

FINGER SHEATHS

CLAIM OF BENEFIT TO RELATED APPLICATIONS

This application claims the benefit of United States provisional patent application entitled "Finger Sheaths" filed on Jun. 12, 2015 and having been assigned Ser. No. 62/174,754. The contents of provisional application 62/174,754 are hereby incorporated by reference.

BACKGROUND

Many of the foods we eat are finger foods. These foods involve using our hands and fingers instead of utensils when placing the foods in our mouths. Some common finger foods include hamburgers, sandwiches, pizza, french fries, chicken wings, chicken fingers, barbeque, ribs, tacos, nachos, fruit, etc. that are best eaten using hands and fingers. Finger foods are especially common at events or large gatherings. Finger foods also make up many of the snacking items we consume. Chips, cheese puffs, candies, snack bars, trail mix, and the like involve using our hands and fingers in consumption.

The convenience, comfort, and portability of finger foods do however come at the cost of hygiene and cleanliness. People may not wash their hands prior to eating finger foods, because of a lack of facilities, simple oversight, or lack of concern. Germs, bacteria, and other harmful elements (e.g., microorganisms, viruses, chemicals, etc.) on our hands and fingers can then make their way into the body as the fingers contact saliva and other parts of the mouth. The after effects of finger foods, though not as harmful, can be undesirable as well. Sauces, sugars, flavorings, oils, etc. can become residual elements that remain on the fingers after consumption. These residual elements can stain clothes, scent the hands and fingers, and cause the hands and fingers to become sticky or greasy. Washing or wiping with napkins or moist towelettes is needed to remove these residual elements.

There is therefore a need to provide a way with which to consume finger foods as intended without the accompanying hygiene and cleanliness issues. Specifically, there is a need to allow consumers the ability to use their fingers when eating finger foods without having to wash their hands before eating because of concern for ingesting harmful elements, and also after eating because residual elements transferred from the finger foods to consumer's fingers.

BRIEF DESCRIPTION OF THE DRAWINGS

Preferred embodiments of the finger sheaths is now be described, by way of example only, with reference to the accompanying drawings in which.

DETAILED DESCRIPTION

Some embodiments provide finger sheaths for individually covering each of the user's fingers. The individual finger coverings prevent the transfer of germs, dirt, and other residual and harmful elements onto the user's fingers when contacting exposed surfaces or items. The finger sheaths have dining applications because of an organic composition. In such applications, the finger sheaths prevent the transfer of germs, dirt, and other residual and harmful elements from the user's fingers to the user's mouth while eating finger foods, thereby eliminating the need for the user to wash his/her hands before using his/her hands to eat finger foods. The individual finger coverings further prevent the transfer of residual elements from the finger food onto the user's fingers, thereby eliminating the need for the user to wash his/her hands after having used his/her fingers to eat the finger food.

The organic composition makes the finger sheaths environmentally friendly for single-use application or re-use if treated properly. The organic composition further prevents the finger sheaths from imparting undesired tastes to the finger foods as would otherwise result from synthetic latex, nitrile rubber, and vinyl used in traditional gloves.

Each finger sheath covers part or all of the user finger and is meant for adults and children, or a certain age. The finger sheath covers any of the index, middle, ring, or pinky fingers or thumb. Each finger sheath can range from a few centimeters (covering only the finger tip) to three inches in length (covering the full length of a finger).

Figure 1:
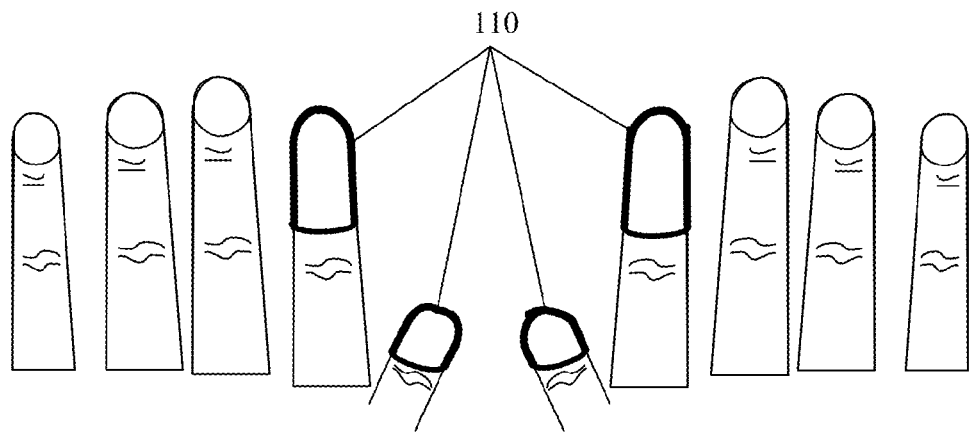
FIG. 1 illustrates finger sheaths covering part of a user's index fingers and thumbs in accordance with some embodiments.
Figure 2:
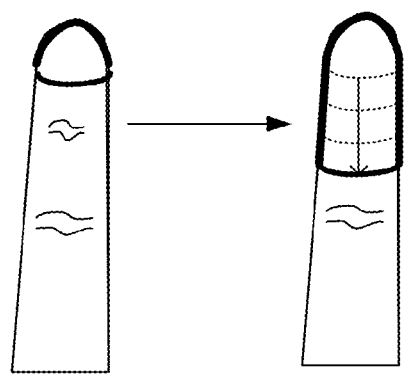
FIG. 2 illustrates extending a finger sheath over a fingertip and down to at least a first knuckle of the finger.

FIG. 1 illustrates finger sheaths 110 covering part of a user's index fingers and thumbs. Each finger sheath is adapted to extend over a fingertip and down to at least a first knuckle of the finger as shown in FIG. 2.

Different embodiments involve manufacturing the finger sheath with different diameters and lengths. Finger sheaths of a first embodiment are sized according to the size of adult fingers, while finger sheaths of a second embodiment are sized according to the size of children fingers. The different sizing changes one or more of the finger sheath length, circumference, and thickness. In some embodiments, the finger sheaths come in small, medium, and large sizes. The small size has an internal diameter of 15 millimeters (mm), length of 40 mm, and a thickness of 0.09 mm; the medium size has an internal diameter of 18 mm, length of 50 mm, and a thickness of 0.11 mm; and the large size has an internal diameter of 21 mm, length of 60 mm, and a thickness of 0.13 mm. In some embodiments, the finger sheaths have a minimum tensile strength of 20 megapascals. It should be noted that different sizing can be provided for different fingers.

Some embodiments insert two or more finger sheaths in biodegradable packaging. At least a first finger sheath in the packaging may be sized according to a user's thumb and a second finger sheath in the packaging may be sized according to the user's index or middle fingers. Additional finger sheaths in the packaging may be sized according to the user's remaining fingers. In some embodiments, two or more finger sheaths within the same packaging are of the same size.

To minimize or eliminate waste resulting from the finger sheaths, the packaging may be resealable such that used finger sheaths are placed into the packaging, sealed, and then mailed to an entity that can recycle, reuse, repurpose, or properly dispose of the finger sheaths. Alternatively, a separate return package may be provided within the original packaging to facilitate the return of the used finger sheaths to the entity.

Figure 3:
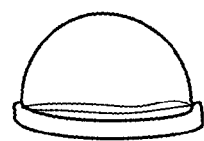
FIG. 3 illustrates a furled finger sheath in accordance with some embodiments.
Figure 4:
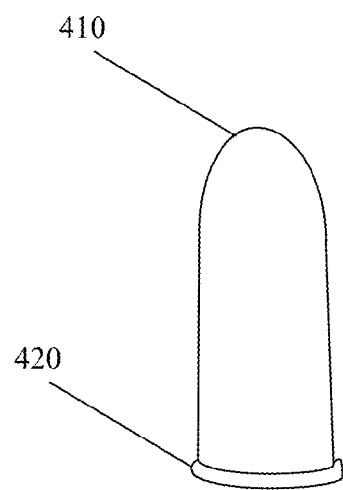
FIG. 4 illustrates a fully unfurled finger sheath in accordance with some embodiments

The finger sheaths comprise a dome top and a body. The dome and body are non-permeable. The finger sheath body is an elongated circular casing that extends vertically from the base of the dome top. In some embodiments, the circular casing is rolled to the base of the dome top. FIG. 3 illustrates a furled finger sheath in accordance with some embodiments. The user applies the furled finger sheath onto his/her finger by placing the dome top over the fingertip and rolling the circular casing down over the finger. FIG. 4 illustrates a fully unfurled finger sheath in accordance with some embodiments.

In some embodiments, the circular casing is embedded with elastic materials to ensure a tight fit over the user finger. In some embodiments, the circular casing includes an elastic band at the end so that the end of the circular casing tightens over the user finger while the rest of the circular casing may loosely cover the user finger. FIG. 4 illustrates the dome top 410 and the elastic band 420 at the base of the circular casing. The elasticity allows the finger sheaths to conform to different finger lengths and thicknesses, providing a one-size-fits-all product for most users.

A primary application of the finger sheaths is to provide a hygienic and biodegradable finger covering that can be inserted into the mouth without transferring harmful elements from the fingers or undesirable taste onto food or the user's mouth. This application eliminates the use of synthetic latex, nitrile rubber, vinyl, and other materials that have medical applications because these materials at the very least impart an undesired taste. Accordingly, the finger sheaths are instead manufactured or composed primarily or entirely of organic materials or natural organic matter (NOM). These materials include fibers, cellulose, sugars, or byproducts of plants. In some embodiments, the organic materials or NOM from which the finger sheaths are composed are different bioplastics.

Hydroxymethylfurfural (HMF) is a bioplastic used in the composition of the finger sheaths of some embodiments. HMF is an organic compound derived from dehydration of glucose and other natural sugars found in plants.

In some other embodiments, the finger sheaths are manufactured or composed of bioplastics formed from isobutene or other gaseous olefins derived from fermenting biomass using specific strains of bacteria. Other bioplastics from which the finger sheaths may be formed are cellulose esters, celluloid, aliphatic biopolyesters, polyhydroxyalkanoates (PHAs), and polylactic acid (PLA) as some examples.

In some embodiments, the finger sheaths are manufactured or composed of a natural rubber or a combination of natural rubber and one or more bioplastics. The natural rubber can be derived from refining latex extracted from living trees.

The organic composition makes the finger sheath biodegradable and compostable. Preferably, the finger sheath structure biodegrades within a relatively short timeframe based on the material composition. This is critical because the finger sheath is intended to be a single-use item, whereby the user dispenses of the finger sheath when finished eating one meal or one or more snacks in a sitting.

Single-use is the primary finger sheath application, because finger foods are themselves intended to be a convenience and quickly consumed. Fast food vendors provide drive-thrus in which the consumer purchases finger foods to eat in the vehicle without ever exiting the vehicle. In this scenario, the consumer does not have convenient access to facilities for washing hands and may not have their own napkins or finger sheaths. The vendor could supply ordinary napkins. However, the napkins do nothing to prevent the transfer of germs or other harmful elements from the user's fingers into the mouth during eating or from potentially contaminating the food by making finger contact with the food. Napkins also do nothing to prevent the user from further dirtying his/her hands while eating. If, however, the user places the finger sheaths over the fingers used to eat the finger foods, the user eliminates the potential for contaminating the food and further eliminates the need for cleaning the hands after eating. The user simply removes and disposes of the finger sheaths when done eating. Although the finger sheaths are ideally suited for such single-use application, they can be reused if desired. In such cases, the user simply rinses the finger sheaths before reuse.

Figure 5:
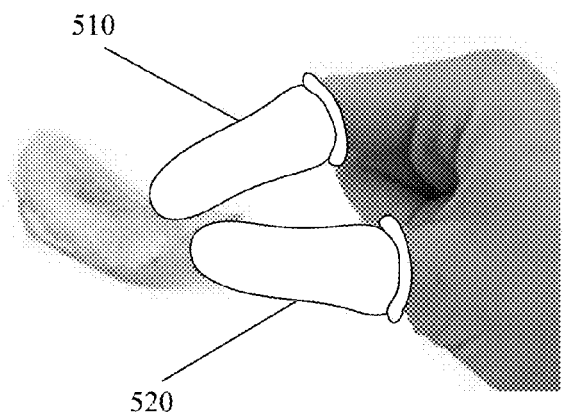
FIG. 5 illustrates a user placing a first finger sheath on the thumb and a second finger sheath on the index finger to cover the two fingers most often used in finger food consumption.

In some embodiments, the finger sheath packaging is composed of the same organic materials as the finger sheaths. Consequently, the packaging is biodegradable like the finger sheaths. In some embodiments, one or more finger sheaths are packaged within or as part of the finger food container or packaging. For example, two finger sheaths may be provided in a chip bag. The user extracts the finger sheaths from the chip bag upon opening the chip bag. The finger sheaths may be individually wrapped or packaged together to ensure they do not come into contact with the chips or other finger food before use. As shown in FIG. 5, the user places a first finger sheath 510 on the thumb and a second finger sheath 520 on the index finger to cover the two fingers most often used in eating chips.

In some embodiments, the finger sheaths are provided as a convenience by finger food vendors separate from the food packaging. For example, the finger sheaths may be dispensed in place of or as a substitute for napkins by vendors at stadiums or at fast food establishments offering finger foods to patrons. The finger sheaths can also be provided during travel, for example, when dining on airplanes, trains, ships, and buses. More generally, the finger sheaths provide a clean and hygienic manner to consume food when convenient access to washrooms is not available. Such is the case when eating at any outdoor event or public space including the beach, circus, concerts, sporting events, picnics, etc.

Although the finger sheaths primary application is to promote safe and hygienic consumption of finger foods, the finger sheaths have additional hygienic applications for protecting the user's fingers from germs, bacteria, and other harmful elements when contacting exposed surfaced and items. Public bathrooms, building doors, shopping carts, and produce at grocery stores are all examples of exposed surfaces that routinely come into contact with different people's hands and, as a result of this contact, can receive germs and other harmful elements that they then pass to other people coming into contact with them. Finger sheaths can be used in these situations to allow a person to safely come into contact with these surfaces without receiving any of the harmful elements that reside thereon.

In some embodiments, the finger sheaths incorporate, infuse, embed, coat, or overlay the finger sheath composition (i.e., head and body) with other organic materials or NOMs bestowing additional hygienic properties beyond shielding the user's fingers. These additional organic materials or NOMs provide antimicrobial, antibacterial, antiviral, or antifungal properties. As a result, even if the user uses the finger sheaths to touch a food, surface, or item with some harmful elements, and accidentally or unknowingly inserts the finger sheaths into the mouth, the composition of the finger sheaths will kill or weaken the harmful elements, thereby reducing the likelihood that they can sicken the user. Moreover, the added properties can improve the shielding that prevents harmful elements from transferring to the user's fingers when wearing the finger sheaths.

In some embodiments, alternative fibers are interwoven, embedded, or otherwise infused into the finger sheath body or composition. The alternative fibers impart antibacterial properties killing or weakening bacteria that contacts the finger sheath alternative fibers. For instance, bamboo fibers can provide the antibacterial properties when embedded in the finger sheath body or composition.

Other alternative fibers can be included in the finger sheath body or composition to impart antimicrobial or antifungal properties. For instance, garlic fibers can be incorporated in the finger sheath body or composition. Additionally or alternatively, an odorless garlic extract can be coated over the exterior of the finger sheaths or infused into the finger sheath body or composition. The incorporation of garlic into the finger sheath composition imparts antimicrobial and antifungal properties. In particular, these properties provide a natural agent for killing or weakening viruses, fungi, and other microbials that contact the finger sheaths.

In some embodiments, different essential oils or related treatments are applied over the exterior of the finger sheaths or are infused into the finger sheath body or composition for antimicrobial, antibacterial, antiviral, or antifungal effect. Other extracts or oils that can be embedded into the finger sheaths or applied to their exterior include coconut oils, ginger extracts, lemon or citrus extracts, oregano extracts, and extracts of various spices (e.g., turmeric, cinnamon, etc.) all of which bestow one or more antimicrobial, antibacterial, antiviral, or antifungal properties to the finger sheaths.

The infusion or embedding of the various antimicrobial, antibacterial, antiviral, or antifungal properties occurs during the manufacturing process. Some embodiments place the finger sheaths in a bath of the desired substance for a period of time during which the organic composition of the finger sheath absorbs the substance. Pressure and temperature can be used to facilitate the infusion. In some embodiments, a preservation compound is applied onto the finger sheath to retain the desired properties of the infused substance for some expiration period.

In some embodiments, the manufacturer or other service provider pretreats the organic materials, NOM, bioplastics, natural rubber, etc. primarily composing the finger sheaths with one or more antimicrobial, antibacterial, antiviral, or antifungal properties. As a result, the finger sheaths can be directly manufactured with the desired properties with the pretreated organic materials, NOM, bioplastics, natural rubber, etc. without any external coating, residue, or other substance on the finger sheaths.

The finger sheath inside may also contain antimicrobial, antibacterial, antiviral, or antifungal properties to clean the exterior of the user's skin once the finger sheath is placed on and removed from the user's fingers. Some embodiments coat the finger sheath inside with a sanitizing gel. The gel may include some amount of glycerine, ethanol, triclosan, or other sanitizing agents. As the user rolls the finger sheath onto a finger, the sanitizing gel comes into contact with the skin neutralizing any harmful elements. When the user removes the finger sheath, the skin that was previously covered will have been sanitized as a result. Instead of in addition to the sanitizing gel, the other antimicrobial, antibacterial, antiviral, or antifungal agents listed above, such as garlic extract, essential oils, etc., can coat or be infused on the inside of the finger sheath to cleanse the user's fingers while being born.

In some embodiments, the finger sheaths have a smooth texture. FIG. 4 illustrates a smooth textured finger sheath.

In some other embodiments, the finger sheaths have a porous, dimpled, or ribbed texture. Ribs can be patterned about the finger sheath outer surface to act like human finger prints and provide friction for gripping finger foods. The ribs can protrude from the finger sheath outer surface or can include engravings within the finger sheath outer surface. Similarly, dimples can be internal concave divots dispersed about the finger sheath outer surface. The dimples can also be external convex dots dispersed about the finger sheath outer surface.

Figure 6:
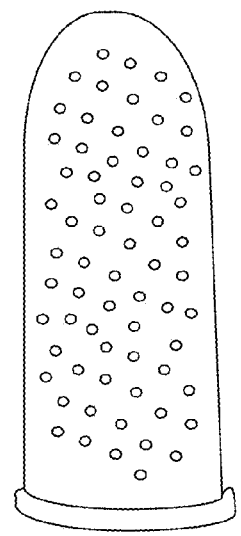
FIG. 6 illustrates a dimpled finger sheath with external convex dots providing a porous texture in accordance with some embodiments.

FIG. 6 illustrates a dimpled finger sheath with external convex dots providing a porous texture in accordance with some embodiments. The porous texture imparts friction aiding in gripping finger foods. The porous texture also adapts the finger sheaths for use in eating foods not intended to be finger foods. For example, noodles are often slippery and require a fork to eat. However, textured finger sheaths can be used to grab and eat multiple noodles with one's hands while retaining the hygiene and cleanliness aspects provided by the finger sheaths during food consumption.

The dimples also act as scoops. When a finger food, such as a buffalo wing, is consumed with a sauce, the dimples can be used to scoop or otherwise carry some quantity of the sauce into the user's mouth. The dimples impart similar functionality for scooping powders or granules. For instance, salt and pepper granules can be scooped or stick to the dimples.

Figure 7:
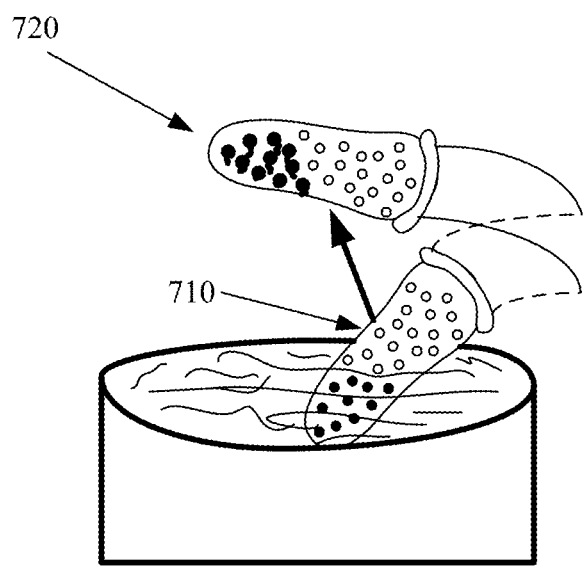
FIG. 7 illustrates the porous outer surface of a finger sheath being used as a scoop to transfer liquid or fine granules in accordance with some embodiments.

FIG. 7 illustrates the porous outer surface of a finger sheath being used as a scoop to transfer liquid or fine granules in accordance with some embodiments. The finger illustrates a user finger partly covered with the finger sheath of some embodiments. The finger is partly inserted into a container containing a liquid or fine granules at 710. Several dimples contact the liquid or granules. The user then lifts the finger upwards at 720. In so doing, the liquid or granules remain temporarily attached to the dimples.

To aid in scooping liquid, some embodiments form the dimples from an absorbent or permeable material while the circular encasing of the finger sheath remains non-permeable. The dimples can be formed by sponge-like protrusions, threads, cellulosic or fiber based elements as some examples.

The dimples themselves can have a porous outer surface to increase the stickiness of the dimples. Fine granules, powder, and even drops of liquid can stick to the dimples, thereby aiding in scooping to the user mouth. A non-transferring sticking agent may coat the dimples to further promote the transfer of fine granules and liquids.

In some embodiments, the finger sheaths are embedded or infused with flavoring to compliment certain finger foods. Different flavorings impart different tastes upon dissolving in the user's mouth as a result of contacting with saliva or other liquid. The dimples described above can be prefilled with a desired flavoring. The user can then suck, lick, or otherwise have the dimples contact the mouth to slowly dissolve and impart the taste associated with the flavoring in to the user's mouth. The dimples can also burst and disperse the flavoring when some force is applied whether by pinching the finger, sucking on the dimples, or biting the dimples. The circular encasing can also be infused with the flavoring. During the manufacturing process, the flavoring is injected or absorbed directly into the organic materials forming the circular encasing. As noted above, the infusion can involves soaking the finger sheaths in a bath of the flavoring for a period of time during which the body's organic composition absorbs some amount of the flavoring. The flavoring is then slowly released when contacted with saliva or other liquid. In some embodiments, the flavoring can be a coating or overlayment added to the exterior of the finger sheath. For instance, the flavoring can be a powder or oil coating the exterior of the finger sheath.

The flavoring provides a means by which the food vendor distributes a base flavor that can then be enhanced or modified by the consumer if desired via the finger sheaths. If the user wants the added flavoring, the user licks or sucks on the finger sheath while consuming the food. For example, a chip vendor can distribute hot or spicy chips along with finger sheaths covered with additional spices or hot sauce flavoring. If the consumer wants the chips to be spicier, then the consumer eats the chips with the finger sheaths or sucks on the finger sheaths as part of eating the chips. As another example, a chip vendor can distribute salted chips and include finger sheaths that impart a vinegar-like flavoring. From the same bag of chips, one consumer can have chips with purely a salt flavoring, while another consumer using the finger sheaths can have chips with a salt and vinegar flavor.

The infused or coated flavoring can also be used as an after snack refreshment. The finger sheath could have a pleasant flavor to be accessed after the meal in order to cover or mask the aroma of the food. In this case, a mint flavoring can be added to the backside of the finger sheath so that the flavoring does not transfer onto or impact the flavor of the food being consumed. Once the user finishes eating, the user may then intentionally place the mint flavored backside section of the finger sheath into the mount and freshen his/her breath. The finger sheaths thus provide the dual benefit of a skin protector and breath freshener.

Some embodiments imprint the finger sheaths with digestible dyes. The imprinting allows logos, branding, coloring, or messaging to be conveyed when the user wears the finger sheath. A three-dimensional food-grade printer can be used to layer the dyes onto the finger sheath surface. Alternatively, the organic material forming the finger sheath body can be stained or impregnated with the dyes in desired locations to produce desired shapes and coloring.

Figure 8:
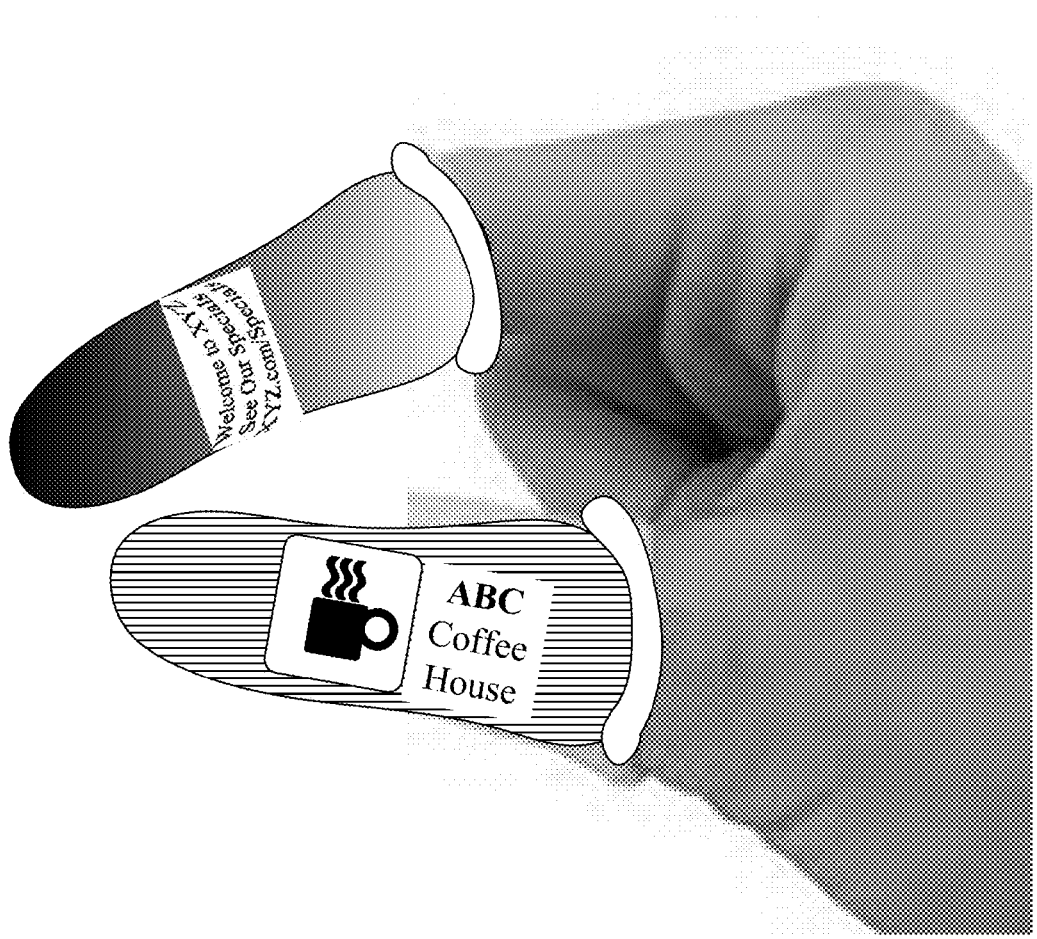
FIG. 8 illustrates customizing a finger sheath with a logo, branding, coloring, or messaging in accordance with some embodiments to alter some or all of the physical appearance.

FIG. 8 illustrates customizing a finger sheath with a logo, branding, coloring, or messaging in accordance with some embodiments to alter some or all of the physical appearance.

In some such embodiments, the digestible dyes include food coloring or other natural dyes that do not impart a flavor or taste to the finger sheaths. The dyes may be permanent or may dissolve over time as the dyes come into contact with saliva or other liquids. The dyes can also be infused with flavoring such that the conveyed logo, branding, coloring, or messaging also functions to enhance or adjust a flavor profile. As the dyes dissolve in response to contacting saliva or other liquid, the dyes impart a taste into the user's mouth.

The imprinting enables the finger sheaths to become a new advertising medium. Advertisers can pay to have their logs, branding, coloring, or messaging printed on the finger sheaths, thereby offsetting the manufacturing and distribution costs of the finger sheaths. This allows finger sheath manufactures to distribute freely or at a lower cost, the finger sheaths to vendors, or for vendors to distribute freely or at a lower cost, the finger sheaths to consumers. In turn, the finger sheaths can be used as a replacement for traditional napkins.

In addition to or instead of advertisement, finger sheath printing can be used to promote or raise brand awareness of a vendor. For example, a fast food restaurant may include or provide the finger sheaths with every kid's meal it sells. The finger sheaths can be printed with the logo, mascots, or characters of the fast food restaurant, thereby raising brand awareness whenever someone consumes one of the kid's meals. In some embodiments, the finger sheaths come in all colors literally creating a rainbow of opportunities for marketers.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. An individual finger covering comprising:
   a dome top;
   an elongated circular encasing extending between one and three inches below the dome top, the elongated circular encasing comprising non-permeable natural rubber infused or coated with at least one of an antimicrobial, antifungal, antiviral, and antibacterial substance on an outer surface of the elongated circular encasing; and
   a plurality of dimples about the outer surface of the elongated circular encasing, the plurality of dimples increasing surface friction of the individual finger covering in gripping slippery or wet objects.

2. The individual finger covering of claim 1, wherein the elongated circular encasing further comprises an elastic band.

3. The individual finger covering of claim 1 further comprising a sanitizing gel infused or coated along an inner surface of the elongated circular encasing.

4. The individual finger covering of claim 1, wherein the antimicrobial, antifungal, antiviral, and antibacterial substance is at least one of a garlic extract, coconut oil, ginger extract, lemon or citrus extract, oregano extract, and spice extract.

5. The individual finger covering of claim 1 further comprising digestible flavoring coating the outer surface of the elongated circular encasing and dissolving from the elongated circular encasing with a specific taste in response to contacting saliva or other liquid.

6. The individual finger covering of claim 1, wherein the elongated circular encasing does not comprise latex, nitrile rubber, or vinyl.

7. The individual finger covering of claim 1, wherein each dimple of the plurality of dimples is infused with a particular flavoring, wherein the particular flavoring dissolves from contact with saliva or a liquid.

8. The individual finger covering of claim 1, wherein each dimple of the plurality of dimples comprises an absorbent material absorbing a liquid or fine granules contacting said dimple.

9. The individual finger covering of claim 1 further comprising a plurality of concave divots about the outer surface of the elongated circular encasing, the plurality of divots providing minute scoops into which fine granules or liquids can be transferred.

10. The individual finger covering of claim 1 further comprising an internal diameter between 15 and 21 millimeters and a thickness between 0.09 and 0.1 millimeters.

11. A finger sheath comprising:
a dome top;
an elongated circular encasing extending between one and three inches below the dome top, the elongated circular encasing comprising organic biodegradable materials imprinted with digestible dyes forming a custom pattern about an outer surface of the encasing; and
a plurality of concave divots about the outer surface of the elongated circular encasing, the plurality of divots providing minute scoops into which fine granules or liquids can be transferred.

12. The finger sheath of claim 11, wherein said digestible dyes dissolve in response to contacting saliva or other liquid.

13. The finger sheath of claim 11 further comprising flavoring about a backside of the encasing with front and sides of the encasing omitting said flavoring, the flavoring imparting taste in response to contacting a user mouth.

14. The finger sheath of claim 11, wherein the organic biodegradable materials comprise at least one of a bioplastic, natural cellulose, and plant byproduct.

15. The finger sheath of claim 11 further comprising flavoring infused within the digestible dyes, wherein the flavoring imparts a particular taste in response to contacting saliva or other liquid.

16. The finger sheath of claim 11 further comprising an antimicrobial substance infused with said organic biodegradable materials.

17. The finger sheath of claim 16 further comprising an antibacterial substance or antiviral substance infused with said antimicrobial substance and said organic biodegradable materials.

18. A finger protecting system comprising:
a sealed biodegradable and organic package;
a first finger protective covering with a first size equivalent to a thumb within said package;
a second finger protective covering with a different second size equivalent to an index, middle, ring, or pinky finger within said package,
wherein the first finger protective covering and the second finger protective covering each comprise (i) a dome top comprising a rim and (ii) an elongated circular encasing furling and unfurling between one and three inches from said rim, the elongated circular encasing comprising organic biodegradable materials with an internal diameter between 15 and 21 millimeters and a thickness between 0.09 and 0.1 millimeters.

19. The finger protecting system of claim 18, wherein the sealed biodegradable and organic package is resealable.

* * * * *